Sept. 16, 1952  W. A. MARSHALL, JR  2,610,796
THERMOSTATIC HEATER CONTROL
Filed Sept. 28, 1945  4 Sheets-Sheet 1
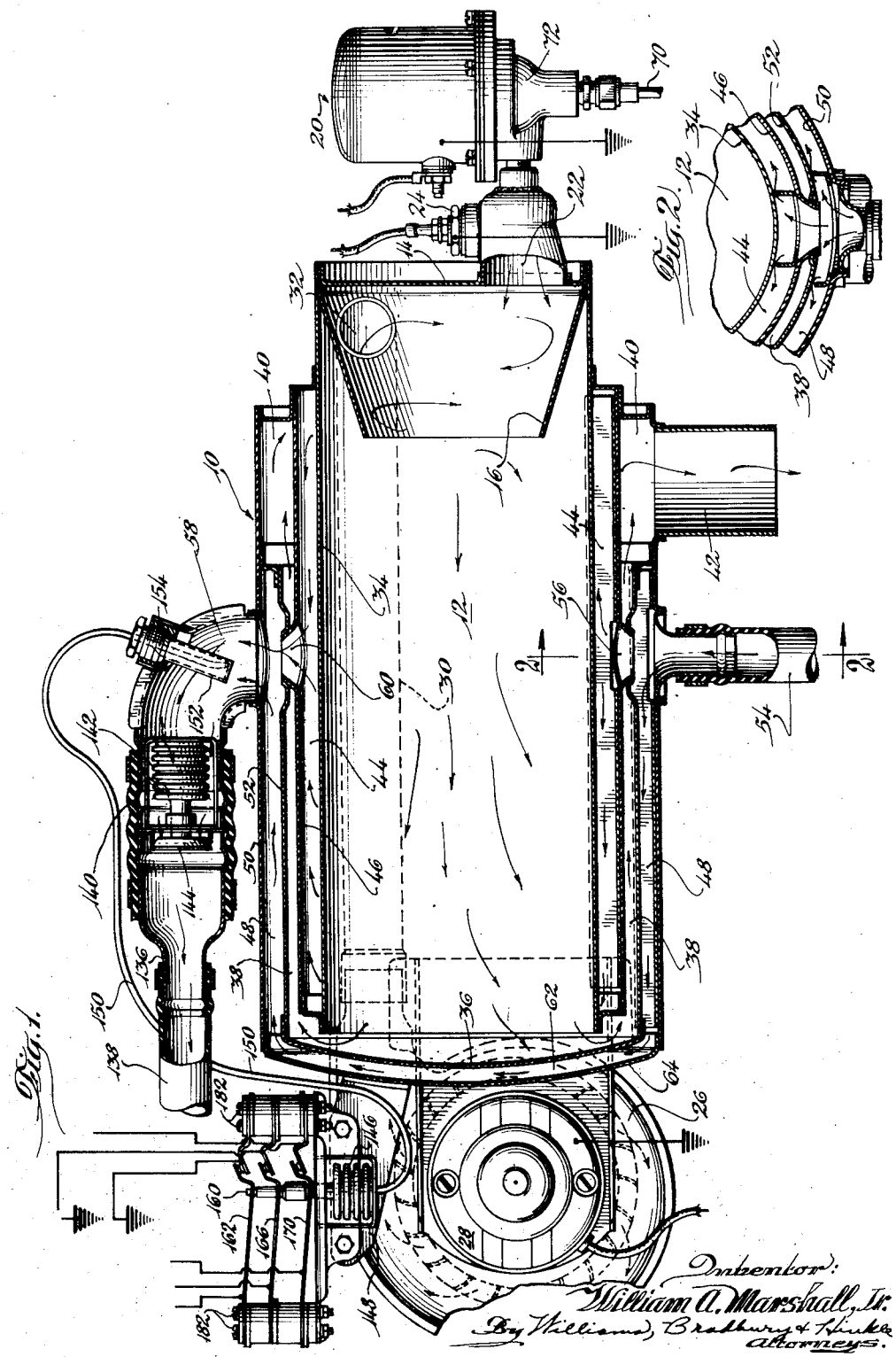

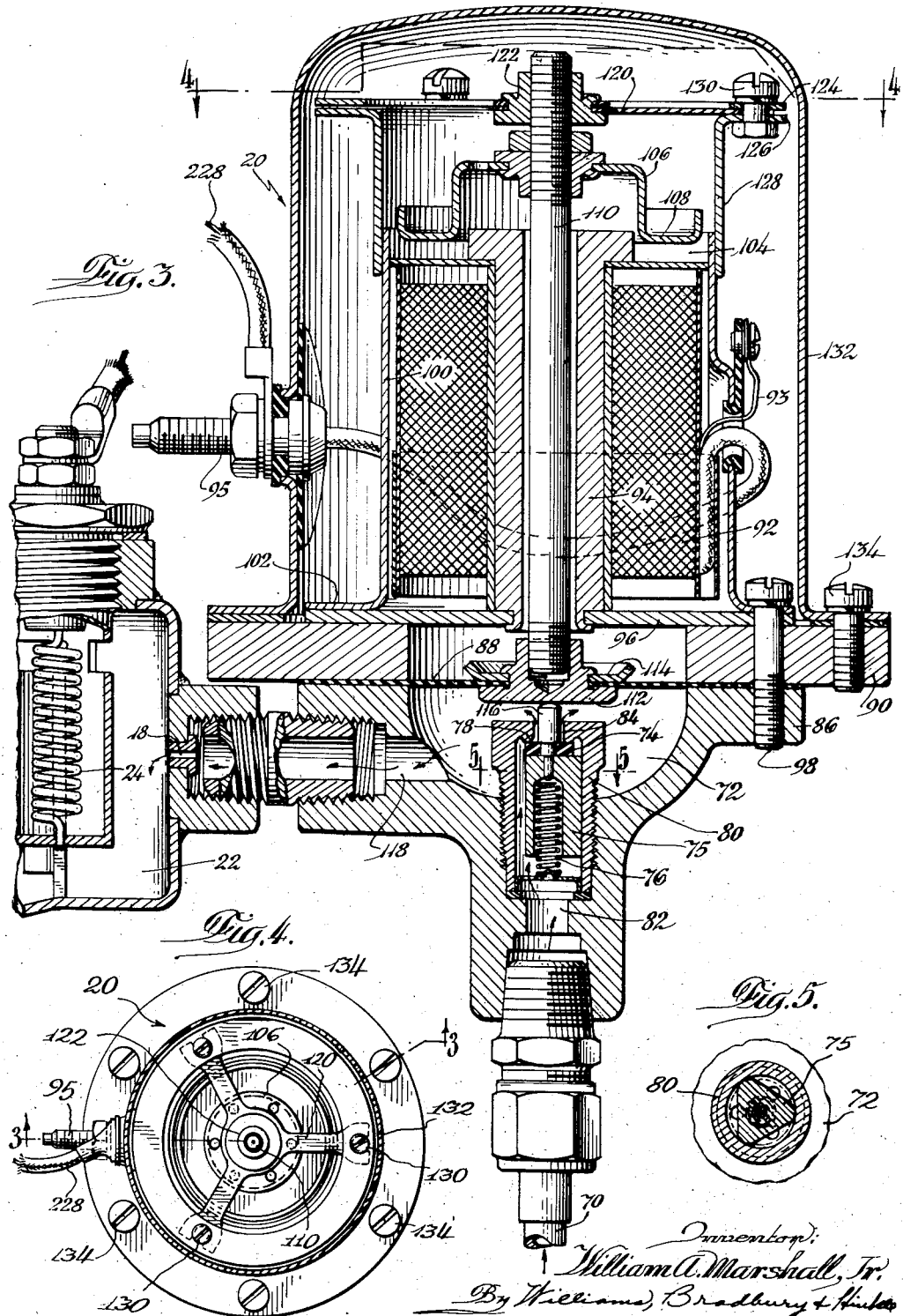

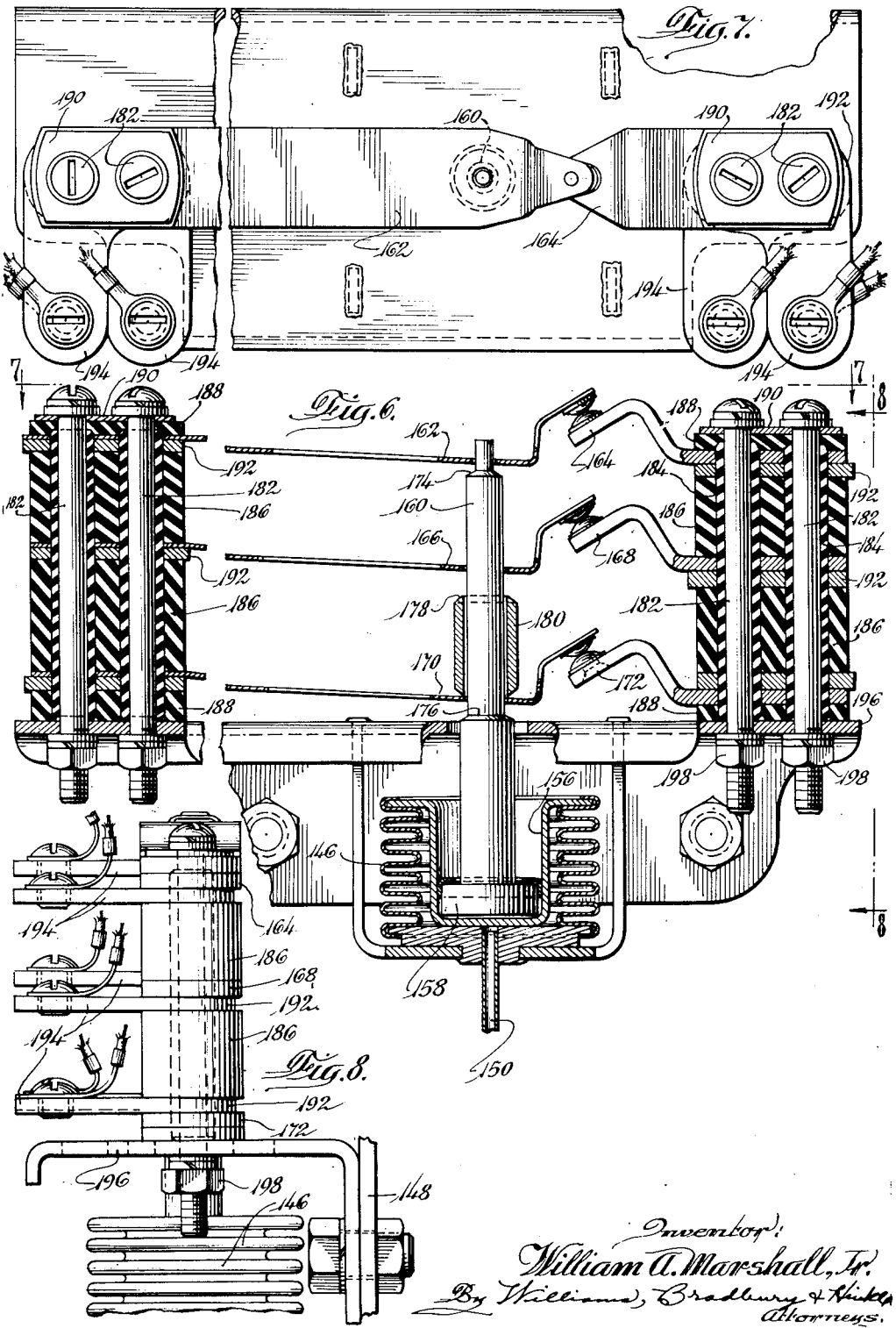

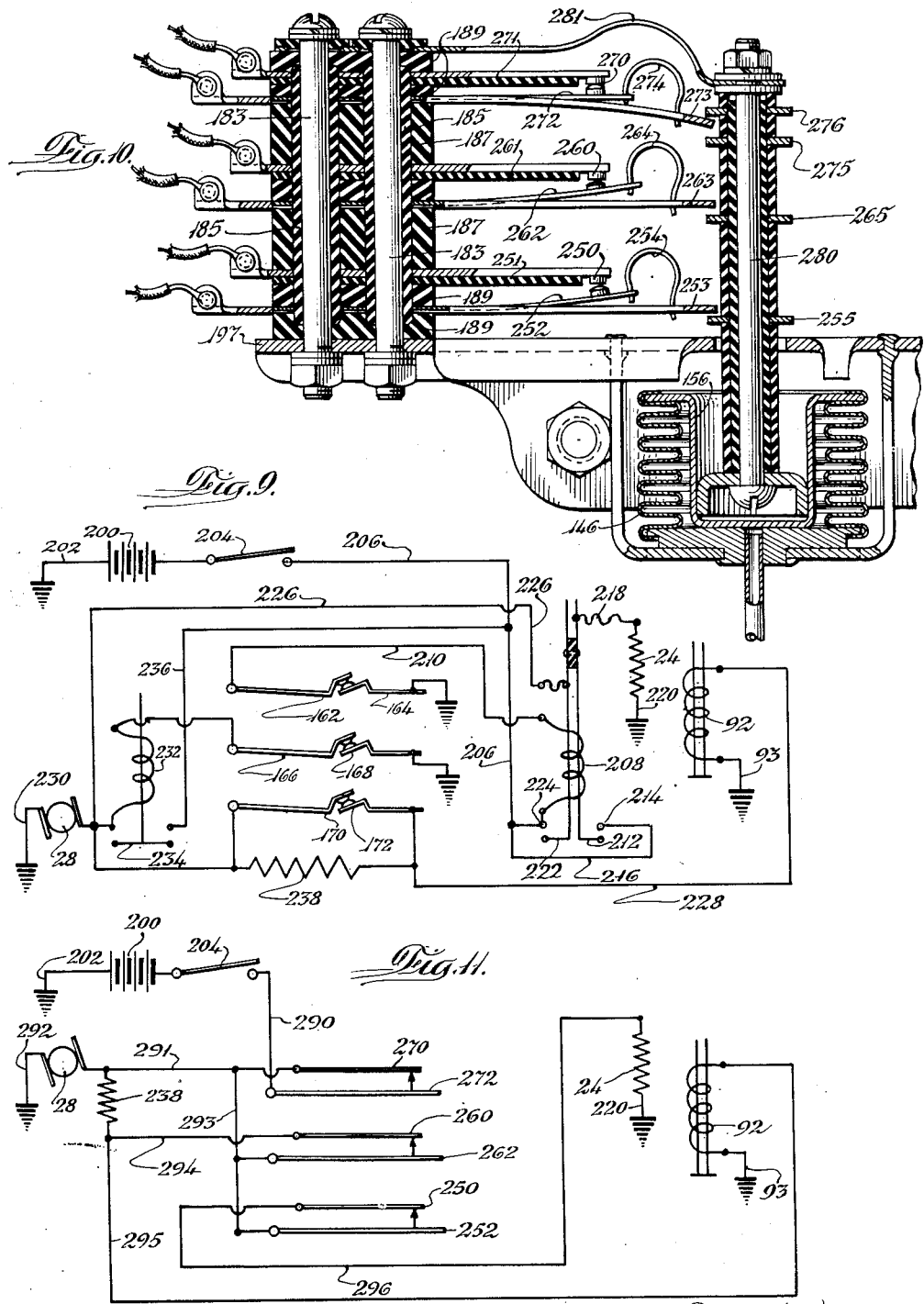

Patented Sept. 16, 1952

2,610,796

UNITED STATES PATENT OFFICE 2,610,796

THERMOSTATIC HEATER CONTROL

William A. Marshall, Jr., Chicago, Ill., assignor to Stewart-Warner Corporation, Chicago, Ill., a corporation of Virginia Application September 28, 1945, Serial No. 619,178

4 Claims. (Cl. 236—20)

This invention relates to heating apparatus and is more particularly concerned with, but not limited to, heating equipment for automobiles and similar vehicles.

In present automotive practice the passenger compartment of a vehicle is frequently heated by means of a hot water radiator connected to the engine cooling system so as to receive a supply of hot water from the water jacket of the internal combustion engine which drives the vehicle. In some installations, only a single heater is used for the entire passenger compartment, while in other installations two or more heaters are employed for this purpose. In some arrangements the hot water radiator is mounted on the dash board which separates the engine compartment from the passenger compartment; in other cases the heating radiator is located beneath the front seat of a passenger automobile. Various other arrangements of hot water heaters are provided for passenger automobiles; and in buses several heaters may be located at different points in the passenger space to insure a substantially uniform distribution of the heating effect.

With any of these arrangements the heat radiating unit or units are ineffective until the temperature of the water in the jacket of the engine has been raised by operation of the engine itself. When the vehicle has been standing in the open or in an unheated garage for an appreciable length of time in cold weather, the water in the engine cooling system is at a low temperature and some little time is required to bring the water to a sufficiently high temperature to enable the heat radiating units to function. Most automobile cooling systems include thermostatic controls which prevent the cooling water or most of it from circulating through the automobile cooling radiator until the temperature of the water in the water jacket has reached a predetermined minimum value. The thermostatic control shortens the time required to bring the engine itself to normal operating condition and also the time required to raise the water in the circulatory system to a sufficiently high temperature so that the heat radiating units will begin to give off heat to the passenger compartment. However, even with the best present installations, a very appreciable period of time is required before the heat units commence supplying heat if the automobile and its cooling system are thoroughly chilled at the time the engine is started.

One object of this invention is to provide an auxiliary heating apparatus for use with a circulatory system having one or more heat radiating units and which will materially shorten the time required to bring the water in the system to a sufficiently high temperature to enable the radiating units to give off heat.

Another object of the invention is to provide an auxiliary heating apparatus which can be installed in the circulatory systems of existing automobiles and which is adapted to be used with any type of hot water heating unit.

A further object of the invention is to provide new and improved preheating apparatus for use in connection with the liquid cooling system of an internal combustion engine and which is adapted to raise the temperature of the liquid in the system independently of the heat radiated by the operation of the engine so as to facilitate starting the engine and to improve the efficiency of its operation immediately after starting.

It is also an object of the invention to provide new and improved heating apparatus applicable to the circulatory system of an internal combustion engine, particularly when such a system includes a heat radiating unit or units, and having automatic controlling means serving to start and stop the operation of the auxiliary heater in accordance with temperature requirements of the system.

More specifically, it is an object of the invention to provide new and improved heating apparatus having a burner, a combustion chamber, and a water jacket with connections by which said jacket may be included in the circulatory cooling system of an internal combustion engine, together with thermostatic means controlling the operation of the burner and located closely adjacent the water outlet of the jacket so as to be responsive to the temperature of the water as it comes from the heater for delivery to the heat radiating units of the vehicle, the heater being coupled between the water jacket of the engine and the radiating units in the vehicle compartment so that if the temperature of the water flowing through the heater from the engine is high enough the heater itself will not be required to operate to furnish heat to the compartment.

It is also an object of the invention to provide a new and improved internal combustion heater having a water jacket with connections therefrom to a circulatory system, the heater including an electrically operated igniter, an electrically driven blower for providing combustion air, and an electrically controlled fuel feeding valve, and having a single thermostatic means arranged to control these electrical devices in a definite sequence so that the igniter is shut off at a predetermined temperature and the fuel supply is cut down at a somewhat higher temperature and eventually cut off at a still higher temperature to terminate operation of the heater, the supply of combustion air being also terminated at that stage.

An additional object of the invention is to provide switch mechanism responsive to the temperature of the water and operative in sequence to de-energize the igniter, then to reduce the rate of fuel supply, and finally, at a predetermined maximum temperature, to shut off the fuel supply and stop combustion in the heater, but with the switch mechanism so arranged that the feeding of fuel to the burner cannot be resumed unless the igniter is also energized.

Other objects and advantages will appear from the following description, taken in conjunction with the accompanying drawings.

In the drawings:

Fig. 1 is a vertical sectional view showing a heater and control devices applied thereto embodying this invention;

Fig. 2 is a detail section taken as indicated at line 2—2 on Fig. 1;

Fig. 3 is a vertical axial section of the electrically operated fuel control valve for the heater together with the igniting device;

Fig. 4 is a detail plan section taken as indicated at line 4—4 on Fig. 3 and on a smaller scale;

Fig. 5 is a detail section taken as indicated at line 5—5 on Fig. 3;

Fig. 6 is a vertical sectional view on an enlarged scale showing the control switches and their actuating bellows;

Fig. 7 is a plan view of the switches taken as indicated at line 7—7 on Fig. 6;

Fig. 8 is an end elevation of the same taken as indicated at line 8—8 on Fig. 6;

Fig. 9 is a wiring diagram for the switch device illustrated in Fig. 8;

Fig. 10 is a vertical sectional view similar to Fig. 6, showing a modified form of switch device for the same purpose;

Fig. 11 is a wiring device for the switch device shown in Fig. 10.

As shown in Figs. 1 and 2, the heater which is designated generally by the numeral 10 is of cylindrical form and includes a cylindrical combustion chamber 12 having an end wall 14 and having an initial combustion space or burner defined by a wall 16 of truncated conical form extending from the wall 14 into the end of the cylindrical chamber 12. The liquid fuel for the combustible mixture is supplied through a restricted orifice 18 leading from the fuel control valve device denoted by the numeral 20; the liquid fuel is discharged into a pocket 22 containing an electrically energized igniter 24 of the incandescent type and opening into the burner space within the conical wall 16. Air for the combustible mixture is supplied by a rotary blower 26 driven by a motor 28 and discharging the air into a feed pipe 30 which terminates in a portion 32 extending through the conical wall 16 in a direction substantially tangential thereto. The air entering the burner space within the wall 16 is thus given a whirling motion as indicated by the arrows in Fig. 1 which facilitates thorough intermixture of the air with the liquid fuel. The mixture is ignited initially by heat from the incandescent element 24 and the flame proceeds through the combustion chamber 12 from the burner space toward the opposite end of the chamber. The cylindrical wall 34 of the chamber 12 terminates in spaced relation to the end wall 36 so that the combustion space 12 communicates with an annular space 38 surrounding it and leading to the annular channel 40 and the exhaust passage 42 extending therefrom.

The water jacket for the water which is to be heated by the products of combustion is in two parts; the inner jacket 44 is defined by the cylindrical wall 34 of the combustion chamber and a cylindrical wall 46 spaced from it as seen in Fig. 1. The outer jacket 48 is contained between the outer cylindrical wall 50 of the heater and an inner cylindrical wall 52 spaced therefrom and from the wall 46. The combustion space 38 is thus disposed between the walls 46 and 52 so that products of combustion are in heat exchange relation with both walls of the jacket 44 and with the inner wall 52 of the jacket 48. An inlet pipe 54 extends from the circulatory system of the vehicle engine into connection with the outer jacket 48 as seen in Fig. 2, and in alignment with this inlet pipe 54 there is provided a connecting thimble 56 affording communication with the inner jacket 44 so that the in-flowing water divides between the two jackets and passes upwardly around both sides of the combustion chamber 12. The water outlet 58 is shown extending from the upper side of the heater casing 50 and in communication with the outer jacket 48. A thimble 60 is arranged in alignment with the outlet 58 for interconnecting the inner jacket 44 and the outer jacket 48 and providing a direct outlet from the inner jacket. The outer jacket 48 includes a space 62 at the end of the combustion chamber 12 between the end wall 36 thereof and the end wall 64 of the heater.

The liquid fuel for the heater is preferably supplied by an engine driven pump (not shown) and flows from a feed pipe 70 into the fuel bowl 72 of the control valve device 20. This valve device is shown in detail in Fig. 3 and includes an inlet valve 74 carried upon a supporting body 75 of triangular cross section having a spring 76 pocketed therein and arranged to uphold the valve body 75 and the valve 74. This valve co-operates with a valve seat 78 formed in the fitting 80. The fitting is screwed into the inlet passage 82 with which the feed pipe 70 is connected and is formed with an outlet port 84 through which the liquid fuel is delivered to the fuel bowl 72 when the valve 74 is opened. Fuel under pressure flowing through the valve port 84 and into the bowl 72 builds up a pressure therein because of the outlet restriction 18 until the upwardly acting force of the bowl pressure against the diaphragm 88 balances the variable force of an electromagnetic means to be described presently and as is more fully described in a co-pending application, Serial No. 577,239, filed February 10, 1945, now abandoned, and assigned to the assignee of this application.

The fuel bowl or chamber 72 is formed with a flange 86, and a flexible diaphragm 88 clamped against it by a ring 90 serves as an upper wall for the fuel chamber, as seen in Fig. 3. An electromagnet surmounting the ring 90 includes a coil 92 fitted on to a core 94 of magnetic material secured at its lower end in a plate 96 which is also of magnetic material. Clamping screws 98 extend through the marginal portions of the plate 96 and through the ring 90 and flange 86 for securing the diaphragm 88 in position and mounting the electromagnet. A cylinder 100 of magnetic material surrounds the coil 92 and its foot flange 102 is secured by the screws 98; thus the upper end of the core 94 forms one pole of the magnet while the annular upper end of the cylinder 100 forms the opposite pole, with an air gap at 104. An armature 106 in the form of an inverted cup is arranged with its flange 108 in the air gap 104 and a brass stem 110 to which the armature is adjustably threaded extends freely through an axial bore in the core 94. The lower end of the stem 110 engages a contact button 112 clamped in the center of the diaphragm 88, with its head engaging the lower face of the diaphragm and having a cupped washer 114 fixed on the shank of the button and engaging the upper face of the diaphragm. A short rod or stem 116 extends through the port 84 in the upper end of the fitting 80 and when the coil 92 is energized and the armature 106 and its stem 110 are drawn downwardly by magnetic attraction, this movement is transmitted through the button 112 and rod 116 to the valve 74 to unseat the latter and permit flow of liquid fuel from the feed pipe 70 through the bowl 72 and through its outlet passage 118 which leads to the restricted orifice 18 through which the fuel is discharged to the burner. The rate at which the fuel feeds through the orifice 18 depends upon the pressure required in the bowl 72 to balance the magnetic force of the coil 92, and this in turn varies with the strength of current supplied to the coil 92. Armature 106 is centered in the annular air gap 104 by a three-armed spider 120 preferably of spring brass carried by a hub 122 threaded to engage the threaded upper end of the stem 110. The arms of the spider 120 are attached by bolts 130 to the flange 126 of a brass or aluminum sleeve 128 telescopically secured to cylinder 100. A flange casing 132 encloses the magnet assembly and is fastened to the ring 90 by screws 134.

The water from the cooling system of the engine (not shown) enters the heater jackets through the inlet pipe 54 and leaves by way of the outlet elbow 58 which ends in a reduced portion 136 to which a hose 138 is secured. In the portion 140 of the outlet passage there is mounted a heat responsive Sylphon bellows 142 controlling a valve 144 which regulates the rate of flow of water through the entire circulatory system. When the water is cold the valve 144 will be closed, but as the temperature of the water rises, the valve will be more or less opened by the vapor pressure of the liquid sealed in the Sylphon 142 and more rapid circulation through the system will be maintained, usually by an engine-driven pump associated therewith.

The operation of the heater is controlled automatically in response to temperature of the water at the outlet 58. A temperature responsive bellows 146 is mounted on a bracket 148 and the interior of the bellows 146 is in communication with the bore of a tube 150 extending into the outlet elbow 58. As shown, the tube 150 terminates within a bulb 152 which contains the liquid, the vaporization of which operates the bellows 146. The threaded head 154 of the bulb is secured in the wall of the outlet 58 with the bulb 152 projecting in the path of the out-flowing water.

The bracket 148 also supports three electrical switches for control of the heater. As shown in Fig. 6, the upper end of the bellows 146 includes a recessed head or end wall 156 in which the headed lower end 158 of an actuating rod 160 is secured so that the rod will move up or down in response to expansion or contraction of the bellows 146. The upper switch includes a movable arm 162 and a fixed contact 164. Immediately below this is another switch having a movable arm 166 and a fixed arm 168. The third switch is shown with a movable arm 170 and fixed contact 172. The rod 160 passes through clearance apertures in each of the movable switch arms and is provided with shoulders which are spaced along the rod 160 for actuating the movable arms in a predetermined sequence. As the temperature rises and causes expansion of the bellows 146, the uppermost shoulder 174 of the rod 160 engages the switch arm 162 and separates it from the fixed contact 164. With a further increase of temperature and expansion of the bellows 146 the shoulder 176 engages the switch arm 170 and separates it from its fixed contact 172. The flexibility of the arms 162 and 170 permits them to be carried upwardly still further after their initial separation from the fixed contacts so that with additional expansion of the bellows 146 the shoulder 178 on the sleeve 180 which is slidable on rod 160 will engage the switch arm 166 and separate it from the contact 168.

As a convenient construction, Fig. 6 shows the fixed contact arms 164, 168 and 172 supported by a pair of upstanding bolts 182, each sheathed in a tube of insulating material 184 over which blocks 186 also of insulating material are assembled in positions to space apart the apertured end portions of contact arms 164, 168 and 172. Insulating plates 188 are disposed above and below the assembly of contacts with a metallic washer plate 190 under the heads of the bolts 182. A connector lug 192 is fitted over the bolts 182 in face contact with each of the members 164, 168 and 172, and said lugs have terminal portions 194 which extend laterally as shown in Fig. 7 for connection with terminal lead wires. The bolts 182 pass through openings in the shelf or base 196 which is secured to the bracket arm 148 and are clamped in position by nuts 198.

The movable arms 162, 166 and 170 of the switches are supported in a substantially similar manner, and in Fig. 6 the corresponding parts of the assembly are designated by the same numerals as the parts which support the fixed contacts as just described.

Fig. 9 presents a wiring diagram in which the switch of Figs. 1 and 6 is employed. A source of electrical energy is indicated as a battery 200 having one terminal grounded at 202 and having the other terminal connected to a main switch 204 through a conductor 206 leading to a relay coil 208 and thence through a conductor 210 to the movable switch arm 162. It may be understood that when the heater is cold all three switch arms 162, 166 and 170 will engage their corresponding fixed contacts; accordingly, the closing of the main switch 204 will establish a circuit through coil 208 since the fixed contact 164 is grounded. The relay coil, upon being energized, actuates two movable switch arms; the arm 212 is engaged with contact 214 so that a circuit is established through conductors 206 and 216 through switch arm 212 and conductor 218 through the igniter coil 24 previously described. The igniter is grounded at 220 as shown in the diagram. The other switch arm 222, actuated by the relay coil 208, engages contact 224 and establishes a circuit through conductor 226 to the movable switch arm 170, thence through the fixed contact 172 and conductor 228 through the coil 92 of the magnetic fuel control valve shown in Fig. 3. As indicated in said Fig. 3, one terminal wire 93 of the coil 92 is grounded on the metallic shell 100; the other lead wire extends to a threaded terminal 95 outside the enclosing cover 132 for connection with the lead wire 228.

To complete the requirements for proper operation of the burner, the closing of the contacts 222—224 also provides current for operating the motor 28 of the combustion air blower 26 which has one terminal connected to the conductor 226 while the other terminal is grounded at 230. Thus when the main switch 204 is closed and the bellows 146 is still cold enough to leave all of the three switch arms 162, 166 and 170 in closed position, the igniter 24 will be energized and rendered incandescent, the magnetic fuel valve 74 will be opened, and the combustion air blower 26 will be started so that a combustible mixture will be supplied and ignited in the burner space with the wall 16 and thereupon combustion will proceed through the chamber 12 and its connected passages leading to the exhaust 42.

As soon as this has continued long enough to raise the temperature of the water to a predetermined minimum value, say, for example, 145° F., the bellows 146 will expand sufficiently to engage the shoulder 174 of the actuating rod 160 with the switch arm 162 and to lift said arm out of engagement with the contact 164. This will open the igniter circuit by de-energizing the relay 208 and allowing the movable switch arm 212 to disengage the contact 214. Combustion will proceed without the assistance of the electrical igniter 24, but the de-energizing of the coil 208 opens the switch 222 as well as the switch 212 and breaks the original circuit leading to the combustion air motor 28 and also the circuit for the magnetic fuel valve. Therefore, a holding relay is provided for these circuits having a coil 232 which is connected to the conductor 226 and the other end of the coil is grounded through the switch arm 166 and its fixed contact 168. When the coil 232 is energized, the relay switch member 234 connects the blower motor 28 to a conductor 236 leading directly from conductor 206 to supply current from the battery 200. The relay switch 234 and conductor 236 also provide a substitute circuit for supplying current to the coil 92 of the magnetic fuel control valve by way of the switch 170, 172 and conductor 228.

As the temperature of the water leaving the heater at 58 continues to rise, the bellows 146 expands further and the shoulder 176 reaches the switch arm 170 and lifts it out of engagement with its contact 172. This forces the current to flow from conductor 226 to conductor 228 through a resistance 238, thus furnishing less current to the coil 92 of the magnetic fuel control valve and permitting the fuel pressure partially to close the valve 74. This reduces the rate of fuel fed to the burner and may prevent a further rise in the temperature of the water. However, if the temperature continues to increase, the bellows 146 will lift the shoulder 178 into contact with the switch arm 166 and then disengage said arm from its fixed contact 168, thereby opening the circuit of the holding coil 232. This opens the relay switch 234, stopping the motor 28 for the combustion air blower and also depriving the coil 92 of current for holding the fuel valve 74 open. Accordingly, the operation of the burner is arrested and it will not be resumed until the temperature of the water at 58 has dropped to the predetermined value at which the switch arm 162 is lowered into engagement with the contact 164 by contraction of the bellows 146. Before this occurs the arms 166 and 170 will have been returned to their initial positions engaging contacts 168 and 172 respectively so that the original condition of the circuits will be restored. Assuming that the main switch 204 has been left closed, the cycle just described will be repeated and this will occur at sufficiently frequent intervals to prevent the temperature of the water leaving the heater at the outlet 58 from falling below 145° F. or whatever predetermined value has been fixed as a minimum. On the other hand, if the heat supplied to the water in the system by operation of the internal combustion engine is sufficient to maintain a water temperature in excess of 145° F., then the bellows 146 will remain distended sufficiently to hold the switch arm 162 at open position, thus preventing operation of the heater and relying upon the engine to supply sufficient surplus heat for warming the passenger compartment of the vehicle.

As an alternative arrangement, to avoid the use of relays Figs. 10 and 11 show a switch mechanism to be actuated by the thermostatic bellows 146, Fig. 11 indicating the circuits controlled by the switch device. The switch mechanism comprises three fixed contacts 250, 260 and 270 carried by substantially rigid arms which extend from an insulated support secured to the shelf portion 197 of the bracket structure which also carries the Sylphon bellows 146. The support includes upstanding bolts 183 enclosed in insulating sleeves 185 and provided with spacing blocks 187 and spacers 189 between which the parts of the switches are clamped. The fixed contact arms 250, 260 and 270 are supported or reinforced by arms of insulating material 251, 261 and 271. The fixed contact 250 normally engages a movable contact arm 252 having one end clamped between the insulating spacers 189 along with one end of its actuating blade 253. The outer end of the contact arm 252 is engaged with the actuating blade 253 by means of a U-shaped spring member 254 which operates in the manner of a toggle to swing the arm 252 downwardly and separate the contacts when the blade 253 is moved upwardly.

The fixed contact 260 cooperates with a movable arm 262 having an actuating blade 263 and a U-spring 264, these parts being similar to those of the switch just described and operating in the same manner. The uppermost switch which includes the fixed contact 270 is shown with a movable contact arm 272, an actuating blade 273 therefor and a U-spring 274 connecting the arm in the blade. All three switches operate with a snap action in separating their contacts; that is, the actuating arm of the switch moves for some distance before causing any movement of the movable contact arm but building up a stress in the U-spring so that when the actuating arm reaches a given point in its movement the switch arm is suddenly snapped in the opposite direction by the stress of the spring. In the case of the two lower switches the actuating arms 253 and 263 when moved upwardly are merely sprung away from their normal straight positions and will tend to return when the upward pressure is relieved. As they return, their movable contact arms 252 and 262 will be snapped back into contact position. The uppermost switch shown in Fig. 10 differs slightly in that the actuating arm 273 wll remain at either limit of its range and must be positively shifted for return to its original position. Because of the difference between this switch and the other two, the operating rod in the form of a bolt 280 which extends upwardly from the recessed head or end wall 156 of the bellows 146 is provided with a single disc 255 to engage the arm 253, a single disc 265 to engage the arm 263 and a pair of discs 275 and 276 spaced apart with the end of the arm 273 between them for positively moving it in both directions. The rod 280 is guided in its movement and held in proper relation to the arms 253, 263 and 273 by means of a vertically flexible member 281 extending from the support bolts 183.

When the temperature of the water flowing through the outlet 58 raises the vapor pressure in the bulb 154 and thus causes expansion of the bellows 146, the initial movement of the rod 280 lifts the actuating arm 253 and causes the contact member 252 to separate from the contact 250. This switch cuts off the current from the igniter coil 24, leaving combustion to maintain itself thereafter. If the temperature of the water increases, so as to cause a further upward movement of the rod 280, the disc 265 lifts the arm 263 far enough to cause the movable arm 262 to be snapped away from the fixed contact arm 260, thus opening the circuit which maintains the fuel control valve 74 in the high pressure position; and if the water temperature continues to rise, the final upward movement of the rod 280 causes disc 275 to lift the arm 273 sufficiently for snapping the arm 272 downwardly out of contact with the arm 270. This breaks the circuit to the fuel control valve, permitting the valve to close and at the same time it cuts off current from the motor 28 of the combustion air blower 26, thus stopping combustion in the heater. Subsequently as the water cools, the bellows 146 will recede and downward movement of the rod 280 will permit the flexed arms 253 and 263 to return to their initial positions as shown in Fig. 10, causing their switch contacts to close. Finally, the disc 276 will engage the arm 275 and snap it downwardly, returning the contact arm 272 into engagement with the contact 270. When this occurs, if the main switch 204 is still closed, the operating cycle will be repeated as the blower 26 is started and the fuel valve 74 is energized while the igniter 24 is energized to initiate combustion of the mixture fed to combustion chamber 12. Fig. 11 indicates the wiring connections for the various elements when a switch of the type shown in Fig. 10 is employed. The battery 200 is grounded at 202 as in the previous arrangement, and the main switch 204 is connected by conductor 290 to the movable arm 272 of the so-called "overheat switch." The fixed arm 270 is connected by conductor 291 with one terminal of the motor 28 for the combustion air blower, the other terminal being grounded at 292. A branch conductor 293 leads from conductor 291 to the movable switch arm 262 and also to the arm 252. The fixed contact 260 is connected by conductor 294 and conductor 295 to the coil 92 of the magnetic fuel control valve, the coil being grounded at 93.

The conductor 293 and switch contact 252 provide a path through the contact 250 and conductor 296 leading to the igniter coil 24 which is shown grounded at 220. When the contacts 250 and 252 are separated the only effect is to de-energize the igniter 24. When the contacts 260 and 262 are separated the current path through conductor 294 leading to the fuel control valve is broken, but a reduced current is then supplied by way of the resistance 238 which is shown connecting the conductor 291 and conductor 295. This permits the heater to operate at low capacity. When the contacts 270 and 272 are separated, the circuit is broken both with respect to the fuel control valve coil at 92 and with respect to the motor 28 and operation of the heater is arrested for the time being. It will be recognized that this simplified circuit can be employed when snap action switches such as those shown in Fig. 10 are used so as to avoid undue arcing when the various branches of the circuit are opened. The switch shown in Fig. 6 is feasible with the circuit shown in Fig. 9 because in that circuit each pair of contacts is connected to the current source either through a relay coil or through a coil of relatively high resistance, such as the solenoid 92, so that the potential drop across any of the switches is not sufficient to produce serious arcing when the circuit is broken.

It will be noted that with either type of switch device the circuits will be opened in an order to first de-energize the igniter, then to cut down the fuel feed, and finally to stop the fuel feed altogether and to simultaneously stop the combustion air blower. But if, upon cooling of the water, these devices were re-energized in reverse sequence, the combustion air blower would be started and the feeding of fuel would commence with the igniter still out of service. This cannot occur when the switch of Fig. 6 is used in the circuit shown in Fig. 9, because neither the blower circuit nor the circuit through the fuel valve coil 92 is completed until the relay coil 208 is energized and this is accomplished only by closing contacts 162 and 164, the last of the three pairs to be engaged by the return or downward movement of the rod 160. If the switch device of Fig. 10 is employed, a similar result is obtained because the contacts 270 and 272, which comprise the last of the three switches to be opened by the rise of water temperature, will not be re-engaged until their actuating arm 273 is bent downward positively by the disc 276, and the disc 276 is so placed on the rod 280 that this can occur only after the other two actuating arms 255 and 265 have been allowed to return to position for closing their associated contacts.

The thermostatic control devices may be adjusted to operate within any desired temperature range. In connection with a conventional automobile engine, the system is adjusted so that the igniter circuit is opened at about 145° F. after combustion is well started in the heater. The low heat switch opens so as to shift the fuel feed from full capacity to low capacity at about 155° F. The overheat switch which shuts off the fuel feed and stops operation of the heater will be set for 165° F., which represents the water temperature at the outlet of the jacket. Normally, the circulatory system of the engine will include a thermostatic valve, commonly positioned between the engine jacket and the radiator of the car, and arranged to open between 155° F. and 160° F. so that until the water in the engine jacket has heated up to this temperature it is not subjected to the cooling effect of the radiator.

Whether or not a circulation is maintained between the heater jacket and the engine jacket depends upon the position of the valve 144 which is disposed in the outlet passage leading from the heater jacket and which is controlled by the thermostatic bellows 142. This thermostat is preferably set to open at about 140° F. This insures that even though the water temperature has cooled somewhat below the point at which the heater was shut off (165° F), the circulation will be maintained between the engine jacket and the heater jacket ad the heat radiating units in the passenger compartment of the vehicle making use of any heat which is contributed by the engine itself. As already explained, after the heater has been shut off at 165° F. it will not begin operating again until the water temperature has dropped to the point at which the igniter switch was opened and at which the igniter will be re-energized, namely about 145° F. The lowest critical temperature in the system thus is 145° F. and the heater will not be called upon to operate until the water temperature drops to this point. Ordinarily, and except in extremely cold weather, the operation of the engine will maintain the water at a satisfactory temperature for heating the passenger compartment without assistance of the internal combustion heater of this invention. However, after the engine has been stopped and the water in the system has become quite cold, the operation of the heater will greatly facilitate warming up of the engine while at the same time producing a comfortable temperature in the passenger compartment without undue delay.

Preferably the operation of the bellows 146 and the switches connected thereto is effected by a quantity of fluid having a low boiling point, such as ethyl alcohol, which is liquid at ordinary temperatures and occupies only a portion of the space in the bulb 152, tube 150 and bellows 146. Upon increase of temperature the vaporization of this liquid exerts a vapor pressure which operates the bellows 146. One advantage of this arrangement is that the system is not critical as to volume since at a certain temperature, depending upon the particular fluid employed, a portion of the fluid will boil and fill the system at a predetermined pressure, rendering it operative thereafter to actuate the switches in the manner already described.

It also is preferable that this system including the bellows 146 and the bulb 152 be initially evacuated below atmospheric pressure, causing the bellows to assume a contracted position. As the bulb heats up the vapor pressure of the fluid therein approaches atmospheric pressure, thus permitting the bellows to expand and operate the switches. With this arrangement, however, if the bellows should crack or the system should otherwise develop a leak, atmospheric air will leak into the system, raising the pressure therein and permitting the bellows to expand and causing all the switch contacts to be opened. This is in the interest of safety since the failure of the control system results merely in shutting off the heater rather than permitting it to operate without proper control.

While there is shown and described herein certain structure embodying this invention, it is to be understood that the invention is not limited thereto or thereby but may assume numerous other forms and that it includes all modifications, variations and equivalents coming within the scope of the claims.

I claim:
1. In an internal combustion heater which includes an electrically energized igniting device, a fuel inlet valve for said heater, an electromagnetic control device for said valve, a source of electrical energy and circuits in which said source is connected with said devices, a first switch operative when closed to energize the igniter, a second switch operative when closed to hold the fuel valve at fully open position, a third switch operative when closed to hold said valve at partially open position, said valve closing upon the opening of said second and third switches, and a single heat responsive device subject to the heat output of the heater and including a movable member which opens the first switch at a predetermined temperature and opens the second switch at a predetermined higher temperature, finally opening the third switch at a predetermined maximum temperature to shut off the fuel supply and interrupt the operation of the heater.

2. In a heater as defined in claim 1, means which prevents re-opening of the fuel valve until the igniter switch is closed.

3. In a heater as defined in claim 1, said third switch being constructed to remain open until positively closed and said movable member including means for positively closing said third switch after said member has effected the closing of the first and second switches in its return movement in response to cooling of the heat responsive device.

4. In an internal combustion heater, the combination of an electrically energized igniting device, electrically energized means for controlling the supply of fuel to the heater, a source of electrical energy, heat responsive means subject to the heat output of the heater, switching means operable by the heat responsive means selectively to energize the igniting device and the fuel controlling means from the source, the switching means including means to terminate energization of the igniting device at a predetermined temperature, means to operate the fuel controlling means to terminate fuel flow at a predetermined higher temperature, and means to prevent operation of the fuel controlling means to commence fuel flow until the igniting device is energized, after said fuel controlling means has terminated fuel flow at said predetermined higher temperature.

WILLIAM A. MARSHALL, Jr.

REFERENCES CITED

The following references are of record in the file of this patent:

UNITED STATES PATENTS

| Number | Name | Date |
|---|---|---|
| 1,220,985 | Harter | Mar. 27, 1917 |
| 1,316,021 | Doble | Sept. 16, 1919 |
| 1,395,399 | Doble et al. | Nov. 1, 1921 |
| 1,529,906 | Morris | Mar. 17, 1925 |
| 1,918,265 | Hartwig | July 18, 1933 |
| 1,923,614 | Clarkson | Aug. 22, 1933 |
| 2,012,067 | Mayo | Aug. 20, 1935 |
| 2,044,427 | Giesler | June 16, 1936 |
| 2,046,643 | Mackintosh | July 7, 1936 |
| 2,046,812 | Danuser et al. | July 7, 1936 |
| 2,162,571 | Bock | June 13, 1939 |
| 2,249,844 | Martin | July 22, 1941 |
| 2,257,755 | Morici et al. | Oct. 7, 1941 |
| 2,257,756 | Morici et al. | Oct. 7, 1941 |
| 2,300,011 | Rose | Oct. 27, 1942 |
| 2,303,382 | Newhouse | Dec. 1, 1942 |
| 2,429,101 | Leslie | Oct. 14, 1947 |
| 2,463,908 | Rose | Mar. 8, 1949 |